(12) United States Patent
Moulton et al.

(10) Patent No.: US 10,710,891 B1
(45) Date of Patent: Jul. 14, 2020

(54) MORPHOLINIUM-BASED QUATERNARY AMMONIUM CATION AND AEI TYPE ZEOLITE MADE THEREWITH

(71) Applicant: SACHEM, INC., Austin, TX (US)

(72) Inventors: Roger Moulton, Austin, TX (US); Charles B. Little, Austin, TX (US)

(73) Assignee: SACHEM, INC., Austin, TX (US)

( * ) Notice: Subject to any disclaimer, the term of this patent is extended or adjusted under 35 U.S.C. 154(b) by 0 days.

(21) Appl. No.: 16/623,148

(22) PCT Filed: Jun. 19, 2018

(86) PCT No.: PCT/US2018/038194
§ 371 (c)(1),
(2) Date: Dec. 16, 2019

(87) PCT Pub. No.: WO2018/236806
PCT Pub. Date: Dec. 27, 2018

Related U.S. Application Data

(60) Provisional application No. 62/521,949, filed on Jun. 19, 2017, provisional application No. 62/685,081, filed on Jun. 14, 2018.

(51) Int. Cl.
*C01B 39/48* (2006.01)
*B01J 29/70* (2006.01)

(52) U.S. Cl.
CPC ............ *C01B 39/48* (2013.01); *B01J 29/70* (2013.01); *C01P 2002/20* (2013.01);
(Continued)

(58) Field of Classification Search
CPC .. C01B 39/48; C01P 2002/20; C01P 2002/60; C01P 2002/86; C01P 2004/02; B01J 29/70
See application file for complete search history.

(56) References Cited

U.S. PATENT DOCUMENTS 4,481,177 A 11/1984 Valyocsik
5,958,370 A 9/1999 Zones et al.
(Continued)

FOREIGN PATENT DOCUMENTS

CN 101104146 1/2008
EP 0116203 8/1984
(Continued)

OTHER PUBLICATIONS

PCT/US2018/038194; PCT International Search Report and Written Opinion of the International Searching Authority dated Aug. 15, 2018.
(Continued)

*Primary Examiner* — David M Brunsman
(74) *Attorney, Agent, or Firm* — Renner, Otto, Boisselle & Sklar, LLP

(57) ABSTRACT

An aluminosilicate zeolite comprising at least 90% phase pure AEI zeolite crystals, the crystals having a plate-shaped morphology. In embodiments, at least 50% of the crystals have at least one ratio in at least one pair of dimensions in the range from 3:1 to 20:1, and thickness of 30-100 nm. A process of making the AEI zeolite comprising reacting an oxide of silicon, faujasite, a quaternary ammonium compound comprising 2,4,4,6-tetramethylmorpholinium cation, alkali metal hydroxide and water at at least 100 C to form crystals of a zeolite having an AEI framework. A crystalline AEI zeolite having pores comprising a 2,4,4,6-tetramethyl-morpholinium, cation. The zeolite may comprise at least 90% phase pure AEI zeolite with the 2,4,4,6-tetramethyl-morpholinium cation within pores of the zeolite. In some embodiments the zeolite comprises crystals having a plate-shaped morphology and with the 2,4,4,6-tetramethylmor-pholinium cation within pores of the AEI zeolite.

19 Claims, 9 Drawing Sheets

(52) U.S. Cl.
CPC ...... *C01P 2002/60* (2013.01); *C01P 2002/86* (2013.01); *C01P 2004/02* (2013.01)

(56) References Cited

U.S. PATENT DOCUMENTS

| | | | |
|---|---|---|---|
| 8,206,498 | B2 | 6/2012 | Garcia-Martinez et al. |
| 8,518,370 | B2 * | 8/2013 | Vermeiren ............... B01J 29/84 |
| | | | 423/305 |
| 9,296,620 | B2 | 3/2016 | Davis |
| 9,670,415 | B2 | 6/2017 | Yilmaz et al. |
| 9,919,296 | B2 | 3/2018 | Yang et al. |
| 2005/0197519 | A1 * | 9/2005 | Cao .......................... C10G 3/45 |
| | | | 585/640 |
| 2008/0033225 | A1 | 2/2008 | Hall et al. |
| 2015/0118150 | A1 * | 4/2015 | Yang ........................ B01J 29/70 |
| | | | 423/704 |
| 2016/0122192 | A1 | 5/2016 | Dusselier et al. |
| 2017/0056870 | A1 | 3/2017 | Ojo et al. |
| 2017/0190587 | A1 | 7/2017 | Li et al. |
| 2018/0093255 | A1 | 4/2018 | Chen et al. |
| 2018/0093256 | A1 | 4/2018 | Chen et al. |
| 2018/0093257 | A1 | 4/2018 | Chen et al. |
| 2018/0093258 | A1 | 4/2018 | Chen et al. |
| 2018/0093259 | A1 | 4/2018 | Chen et al. |

FOREIGN PATENT DOCUMENTS

| | | |
|---|---|---|
| WO | 2008016423 | 2/2008 |
| WO | 2016073329 | 5/2016 |
| WO | 2018064268 | 4/2018 |

OTHER PUBLICATIONS

PCT/US2018/038194; PCT International Preliminary Report on Patentability dated Aug. 1, 2019.

Ross Ransom et al: "Synthesis and Growth Kinetics of Zeolite SSZ-39", Industrial & Engineering Chemistry Research, vol. 56, No. 15, Apr. 4, 2017, pp. 4350-4356.

Mohammad Rostamizadeh et al: "Synthesis and Characterization of HZSM-5 Catalyst for Methanol to Propylene (MTP) Reaction", Synthesis and Reactivity in Inorganic, Metal-Organic Nano-Metal Chemistry, vol. 46, No. 5, Aug. 4, 2015, pp. 665-671.

Manuel Moliner et al; "Cu-SSZ-39, an active and hydrothermally stable catalyst for the selective catalytic reduction of NOx", Chemical Communications, vol. 48, No. 66, Jun. 27, 2012, p. 8264.

Manuel Moliner et al; "Electronic Supplementary Information (ESI) Cu-SSZ-39, an active and hydrothermally stable catalyst for the selective catalytic reduction of NOx", Jun. 27, 2012.

Paul Wagner et al; "Guest/Host Relationships in the Synthesis of the Novel Cage-Based Zeolites SSZ-35, SSZ-36, and SSZ-39", Journal of the American Chemical Society, American Chemical Society, US, vol. 122, No. 2, Dec. 31, 1999, pp. 263-273.

Paul Wagner et al: "Guest/Host Relationships in the Synthesis of the Novel Cage-Based Zeolites SSZ-35, SSZ-36, and SSZ-39—Supplementary data: synthesis of guest molecules", Journal of the American Chemical Society, vol. 122, No. 2, Dec. 31, 1999, pp. 263-273.

Nakagawa et al.; (Microporous Mesoporous Materials, 22, 1989, 69-85, a reference cited by Wagner) (Year: 1989).

Wagner et al.; JACS, 2000, Supplementary Information (Year: 2000).

* cited by examiner

US 10,710,891 B1

MORPHOLINIUM-BASED QUATERNARY AMMONIUM CATION AND AEI TYPE ZEOLITE MADE THEREWITH

CROSS-REFERENCE TO RELATED APPLICATION

The present application is a U.S. National Stage Application based on and claiming benefit and priority under 35 U.S.C. § 371 of International Application No. PCT/US2018/038194, filed 19 Jun. 2018, which in turn claims benefit under 35 U.S.C. § 119 to U.S. Provisional Application No. 62/521,949, filed 19 Jun. 2017, entitled, PROCESS FOR SSZ-39 SYNTHESIS USING MODIFIED OSDA FORMULATION, and to U.S. Provisional Application No. 62/685,081, filed 14 Jun. 2018, entitled MORPHOLINIUM-BASED QUATERNARY AMMONIUM CATION AND AEI TYPE ZEOLITE MADE THEREWITH, the entireties of all three of which are hereby incorporated herein by reference.

TECHNICAL FIELD

The present invention relates to a new quaternary ammonium compound for synthesis of AEI-type zeolites, and to a new AEI-type zeolite made by use of this compound. The new quaternary ammonium compound includes a morpholinium-based moiety. The new AEI-type zeolite, referred to herein as SAZ-1, displays a novel morphology that may be described as nano-sized thin, planar, plate-shaped crystals.

BACKGROUND

Zeolites have numerous industrial applications, and zeolites having an AEI framework are known to be effective catalysts for treating internal combustion exhaust gases, for selective catalytic reduction of NOx in exhaust gases, and, e.g., for methanol-to-olefin conversion. Of particular interest is SSZ-39 zeolite. Zeolites such as SSZ-39 are made with organic structure-directing agents (OSDAs), sometimes referred to as templates, which are usually organic bases which guide or direct the molecular shape and pattern of the zeolite framework. The OSDAs act something like a frame around which the zeolite crystals form, and following the formation of the crystals, the OSDA is removed, leaving a porous aluminosilicate structure.

One of the most commonly used ammonium based OSDAs for making SSZ-39 is N,N-dimethyl-3,5-dimethyl-piperidinium cation, which is usually provided as the hydroxide in the synthesis of SSZ-39, which herein is referred to as "PIPPY". PIPPY is also sometimes referred to as 1,1,3,5-tetramethylpiperidinium cation, usually provided as the hydroxide.

An ongoing problem that continues to exist in conventional processes for making AEI framework zeolites, particularly SSZ-39 zeolites, is that the morphology of the zeolite crystals produced may not be optimum for some catalytic applications, for example, the crystals may be, on one hand, too thick or too big, or on the other hand, too small and/or too easily packed too tightly to be efficiently used in catalytic applications. In other cases, the surface area to volume ratio may be too small, which results in many of the inner pores being inaccessible to the reaction components. The resulting low activity inevitably raises the cost of using the catalyst.

SUMMARY

The present inventors set out to improve the catalytic activity of zeolites by decreasing certain dimensions of the crystals, since previously known ammonium based OSDAs for AEI framework zeolites have not been found to provide a crystal morphology with thickness dimension less than =100 nanometer (nm) when one or both of the other two dimensions of the crystal are, e.g., 500 nm or greater. The present inventors have discovered how to make such nano-sized crystals that are plate-shaped.

The present inventors have discovered that by replacing some or all of the PIPPY or other OSDA for making AEI framework zeolites with 2,4,4,6-tetramethyl morpholinium hydroxide, referred to herein as "MOPEY", a new AEI morphology can be obtained, in which the zeolite is in the form of plates of about 0.5-1 micron on one or both edges, but as low as 30 nm in thickness. This new plate-shaped crystal, referred to herein as "SAZ-1", which we anticipate will provide better access to the active catalytic sites when used as a catalyst to replace SSZ-39, which crystals conventionally are, for example, 300 nm thick, and more cubic morphologically. Thus, the present invention can provide the above-noted desirable goal, i.e., to obtain an AEI framework zeolite having dimensions that facilitate use of the zeolite, including improved access to inner pores. In accordance with the present invention, the new compound, MOPEY, is used for replacing some or all of the organic base. The MOPEY, i.e., the 2,4,4,6-tetramethyl morpholinium cation, is usually provided and used as the hydroxide.

Another advantage of the MOPEY as replacement for some or all of the organic base for making SSZ-39 zeolite is that it suppresses the formation of a competing phase with GME topology (Dusselier, et. al., Angew. Chem. Int. Ed., v56, issue 43, pp 13475-13478, 2017). The most favored conventional recipes for PIPPY-based OSDA for SSZ-39 zeolites employ a low $H_2O/Si$ ratio (to improve payload), and high OSDA content (to produce high Si/Al product and smaller crystals), but these conditions also tend to favor GME formation. Even in recipes with higher water contents, the higher load of OSDA is more expensive. The MOPEY described herein is not compatible with formation of GME, so making desirable forms of AEI zeolite is more easily accomplished. This benefit is in addition to the ability to obtain the new, improved morphology in the SAZ-1 zeolite disclosed herein.

In one embodiment, MOPEY is used as a reactant, to replace some or all of known organic bases such as PIPPY, in an aluminosilicate zeolite recipe with OSDA/Si ratio between 0.07 and 0.21 in place of some or all of the tetraalkyl piperidinium hydroxide in known SSZ-39 recipes. In some recipes, at least a small quantity of PIPPY or other known OSDA for SSZ-39 is needed, while in many recipes, the MOPEY can replace all of the conventional OSDA for making the SSZ-39.

The result of either of these substitutions, i.e., either replacing some or replacing all, of the PIPPY or other known OSDA for making SSZ-39 zeolite, with MOPEY, allows the present inventors to produce a new AEI zeolite which has a previously unknown morphology. This new morphology zeolite is referred to herein as SAZ-1, which has crystals that may be planar, thin (e.g., as thin as 30 nm in thickness) and plate-shaped, but which still function similarly to or better than known SSZ-39 zeolites.

In one embodiment, the present invention provides a new composition of matter, comprising a crystalline AEI zeolite having pores comprising MOPEY. This composition is the reaction product isolated from the zeolite-forming process, prior to the step of calcining the product, which is used to remove the organic bases in the reaction mixture, and which is commonly and normally done in the production of zeolites. This composition of matter has not been previously known, since MOPEY has not been previously used to form AEI zeolites. It is well known that, in the zeolite-forming reaction, the OSDA or other quaternary ammonium compound(s) present, are taken up and are bound in the crystal structure of the initially formed zeolite crystals. In the normal course of production of zeolites, the initially formed crystals are calcined, and all of the organic material, including in this invention, the MOPEY, are burned out and removed, creating the intricate pores of the zeolite structure. In various embodiments, these initially isolated crystals have both MOPEY within the structure and the plate-shaped morphology as defined herein.

In one embodiment, the present invention provides a new composition of matter, comprising zeolite crystals having a new, plate-shaped morphology which was previously unknown. In one embodiment, the plate-shaped morphology crystals comprise planar crystals, having substantially greater width and/or length than thickness, as described below in more detail.

Accordingly, in one embodiment of the present invention, there is provided an aluminosilicate zeolite comprising at least 90% phase pure AEI zeolite, SAZ-1, wherein the AEI zeolite comprises crystals having a plate-shaped morphology. In one embodiment, at least 50% of the crystals have at least one ratio in at least one pair of dimensions in the range from 3:1 to 20:1. In one embodiment, at least 50% of the crystals have a thickness in the range from 30 nm to 100 nm. In one embodiment, at least 50% of the crystals range from about 0.3-2.0 micron in length, from about 0.3-2.0 micron in width, and from about 30 nm to about 100 nm in thickness.

In one embodiment, the present invention provides a process of making an aluminosilicate zeolite having an AEI framework comprising reacting a mixture comprising an oxide of silicon, faujasite, a quaternary ammonium compound comprising a 2,4,4,6-tetramethylmorpholinium cation, an alkali metal hydroxide and water at a temperature of at least 100° C. for a time sufficient to form crystals of an aluminosilicate zeolite having an AEI framework. In one embodiment, the process provides crystals having a plate-shaped morphology. In one embodiment, the process provides crystals in which at least 50% of the crystals have at least one ratio in at least one pair of dimensions in the range from 3:1 to 20:1. In one embodiment, the process provides crystals wherein at least 50% of the crystals range from about 0.3-2.0 micron in length, from about 0.3-2.0 micron in width, and from about 30 nm to about 100 nm in thickness.

In one embodiment, in the process the quaternary ammonium compound further comprises an organic structure directing agent known for making SSZ-39. In one embodiment, in the process the quaternary ammonium compound further comprises a N,N-dimethyl-3,5-dimethylpiperidinium cation. In one embodiment, the process provides crystals wherein at least 50% of the crystals range from about 30 nm to about 100 nm in thickness.

In one embodiment, the invention provides a crystalline AEI zeolite having pores comprising a 2,4,4,6-tetramethylmorpholinium cation. In one embodiment, the pores further comprise a N,N-dimethyl-3,5-dimethylpiperidinium cation. In one embodiment, the zeolite comprises at least 90% phase pure AEI zeolite. In one embodiment, the AEI zeolite comprises crystals having a plate-shaped morphology. In one embodiment, at least 50% of the crystals have at least one ratio in at least one pair of dimensions in the range from 3:1 to 20:1. In one embodiment, at least 50% of the crystals range from about 30 nm to about 100 nm in thickness.

In some embodiments of the present invention, MOPEY is used to completely replace known OSDAs for making AEI zeolites. In some embodiments of the present invention, MOPEY is used to only partially replace known OSDAs for making SSZ-39 zeolites. In the present invention, use of the MOPEY in forming the new SAZ-1 zeolite provides the new morphology described herein.

BRIEF DESCRIPTION OF DRAWINGS

The figures include photomicrographs of the zeolite crystals having the AEI framework, i.e., SAZ-1, made according to the present invention and in some cases comparative examples.

DETAILED DESCRIPTION

Figure 1:
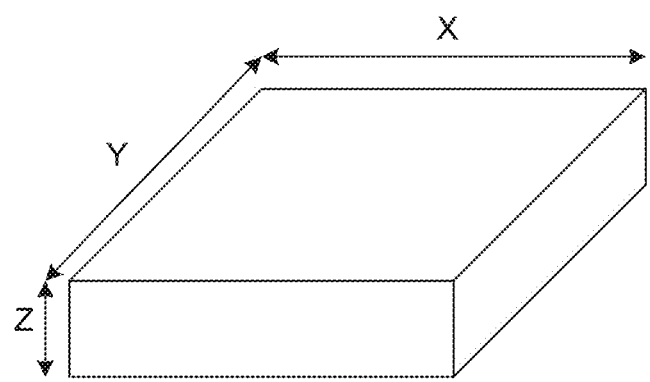
FIG. 1 is a drawing defining the X, Y, and Z axes of a plate-shaped zeolite crystal made in accordance with the present invention.

One of the most popular conventional OSDAs for SSZ-39 is 1,1,3,5-tetramethyl piperidinium hydroxide, referred to herein as "PIPPY". This OSDA molecule has two symmetrical chiral carbon atoms, which creates a pair of diastereomers, in which the methyl groups at the 3- and 5-positions are in either the cis or trans orientation relative to each other. For the purposes of synthesizing SSZ-39, research has shown that the trans isomer is much the better of the two (Dusselier, et. al., Chem. Mater., v 27, issue 7, pp 2695-2702, 2015). However the hydrogenation catalysts that are used to make the commercially available piperidine precursor to PIPPY favor the cis isomer, so the potential advantages of a higher trans content PIPPY in the synthesis of SSZ-39 remain largely unexplored.

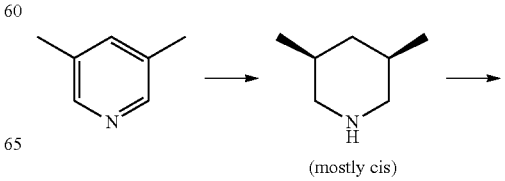

(mostly cis)

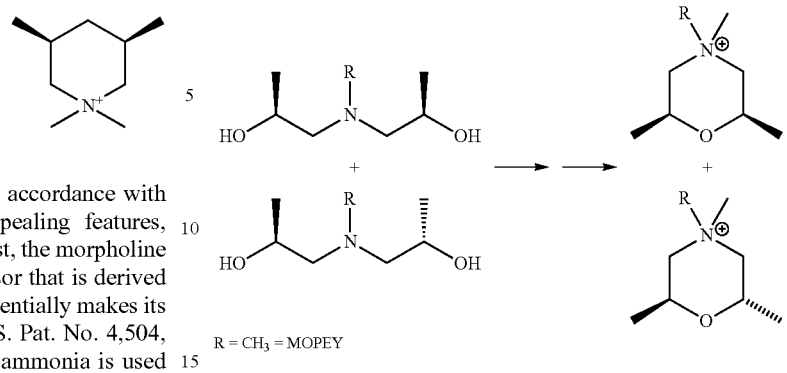

R = CH₃ = MOPEY

The tetramethylmorpholinium cation in accordance with the present invention presents some appealing features, especially with regards to its synthesis. First, the morpholine precursor can be made from a diol precursor that is derived from readily available materials, which potentially makes its production very economical (see, e.g., U.S. Pat. No. 4,504, 363). Second, if methylamine rather than ammonia is used in this synthesis then the morpholine precursor to MOPEY already bears one of the two N-methyl groups in the final product, thus shortening the overall synthesis (see, e.g., U.S. Pat. No. 4,068,077). One skilled in the art can readily see that this approach may be used to create analogues to MOPEY in which at least one ring nitrogen substituent is other than methyl.

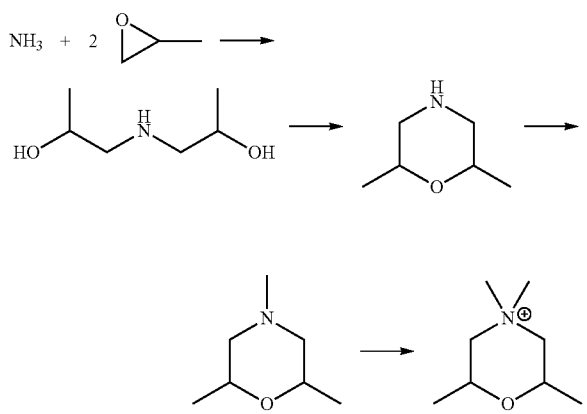

Further, the product of reaction between propylene oxide and either ammonia or a primary alkylamine forms, with no deliberate enhancement, a 50:50 mixture of diastereomeric diols.

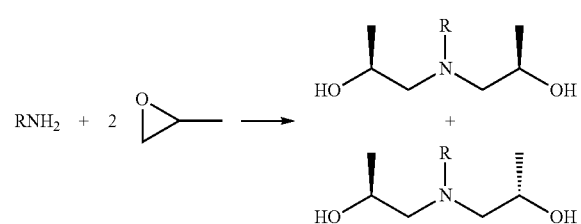

The ring-closing reaction that forms the morpholine ring from this mixture of diastereomeric diols can, therefore, produce a mixture of diasteromeric morpholines with a much higher content of the trans isomer compared to the precursor to PIPPY that is made by hydrogenation of 3,5-lutidine. Thus, the tetramethylmorpholinium product (when R=Me) can have a considerably higher trans isomer content than does PIPPY when made from commercially available starting material.

The present inventors are aware of no prior art on the use any morpholinium cation for the synthesis of AEI zeolites. Indeed, tetramethylmorpholinium cation has been reported in a zeolite synthesis only once before, to make ZSM-12. As the present inventors have discovered, MOPEY shows many of the structure directing effects that have been documented previously for its piperidinium analog, but there are also important differences.

In one embodiment, the present disclosure is directed to an aluminosilicate zeolite, SAZ-1, comprising at least about 90% phase pure AEI framework, wherein the aluminosilicate zeolite crystals have a plate-shaped morphology. In other embodiments, the zeolite comprises at least about 95%, 98% or 99% phase pure AEI framework, and at least 50% of the zeolite crystals have a plate-shaped morphology. In other embodiments, at least 60%, 70%, 80% or greater of the crystals have the plate-shaped morphology, as described in more detail below.

The SAZ-1 zeolites of the present invention are pure or substantially pure AEI phase. As used herein, the term "AEI" refers to an AEI framework type as recognized by the International Zeolite Association (IZA) Structure Commission. The term "zeolite" refers to an aluminosilicate molecular sieve having a framework composed primarily of alumina and silica moieties, and thus does not include other isotypes such as SAPOs, AlPOs, and the like. As used herein, the term "pure phase" means that at least about 90 percent of the zeolite framework is type AEI. The SAZ-1 zeolite can contain at least about 95 percent, or even at least about 97 percent of the AEI framework crystallinity. The SAZ-1 zeolite can be substantially free of other crystalline phases and typically it is not an intergrowth of two or more framework types. As used herein with respect to other phases that may be present as impurities in the AEI framework, the term "minor" means an amount of 10% by weight or less, and the term "trace" means an amount of less than 2% by weight, the basis weight being the weight of the total zeolite, including all phases present.

In one embodiment, the present invention provides a new composition of matter, which was previously unknown, comprising a crystalline SAZ-1 zeolite having pores comprising MOPEY. This composition is the reaction product isolated from the zeolite-forming process, prior to the step of calcining the product to remove the occluded organics, which is commonly and normally done in the production of zeolites. This composition of matter is new, since MOPEY has not been used to make AEI zeolites, and this crystalline product, prior to calcination, contains MOPEY in the crystal structure, as shown by NMR analysis of the isolated crystals. See FIG. 9 and the discussion below. Of course, once the crystals have been calcined, the MOPEY will have been removed, but the crystals will retain their unique plate-shaped morphology, which constitutes the other new composition of matter as described herein. The NMR shows that the MOPEY is incorporated into the initially formed and isolated crystals of SAZ-1, as discussed in more detail with response to FIG. 9.

In one embodiment, the present invention provides a new composition of matter, comprising SAZ-1 zeolite crystals having a new, planar, plate-shaped morphology which was previously unknown. In one embodiment, the plate-shaped morphology crystals comprise planar crystals, having substantially greater width and/or length than thickness, as described in more detail in the following disclosure.

An important advantage of the present invention is the plate-shaped morphology of the crystals of SAZ-1 prepared according to the process of the present invention. The conventional crystals of SSZ-39 are, according to various methods, one of cuboid, randomly shaped, or otherwise not having the relatively planar shape of a plate. It is known in the catalyst arts that for processes utilizing zeolites, that access to interior surfaces is important. To this end, increased surface area is important, but also that the benefit of such increased surface area is often counterbalanced by the particles being small and readily packed into agglomerates. In the present invention, the crystals of SAZ-1 display a plate-shaped morphology that provides high surface area but which resists packing into agglomerates. These plate-shaped morphologies, as shown in the drawings, are flat and thin, e.g., planar, giving a high aspect ratio of one or both of the X and Y axes relative or compared to the Z axis, where the X, Y and Z axes have their convention perpendicular orientations to each other, as shown in FIG. 1.

Thus, by use of MOPEY in the reaction composition used to form the new SAZ-1 zeolite, two new compositions of matter have been discovered and made, in accordance with embodiments of the present invention.

As used herein, the term "length", when applied in describing the plate-shaped crystals obtained in accordance with the present invention, refers to the longest dimension of any given crystal, and is considered to be the "X" axis. As used herein, the term "width", when applied in describing the plate-shaped crystals obtained in accordance with the present invention, refers to the second longest dimension of any given crystal, which is generally perpendicular to the length direction, and is considered to be the "Y" axis. As used herein, the term "height", or "thickness", when applied in describing the plate-shaped crystals obtained in accordance with the present invention, refers to the smallest dimension of any given crystal, and is considered to be the "Z" axis. See FIG. 1.

As used herein, the term "aspect ratio", when applied in describing the plate-shaped SAZ-1 crystals obtained in accordance with the present invention, means the ratio of at least one of the X and Y axes to the Z axis, as shown in FIG. 1.

Thus, in one embodiment, at least 50% of the SAZ-1 zeolite particles are plate-shaped with at least one ratio of at least 3:1, and in one embodiment, at least 5:1. In one embodiment, at least 50% of the SAZ-1 zeolite particles are plate-shaped with at least one ratio in the range from 3:1 to 20:1, and in one embodiment, from 5:1 to 20:1. In one embodiment, at least 75% of the SAZ-1 zeolite particles are plate-shaped with at least one ratio of at least 3:1, and in one embodiment, at least 5:1. In one embodiment, at least 75% of the SAZ-1 zeolite particles are plate-shaped with at least one ratio in the range from 3:1 to 20:1, and in one embodiment, from 5:1 to 20:1. In one embodiment, at least 85% of the SAZ-1 zeolite particles are plate-shaped with at least one ratio of at least 3:1, and in one embodiment, at least 5:1. In one embodiment, at least 85% of the SAZ-1 zeolite particles are plate-shaped with at least one ratio in the range from 3:1 to 20:1, and in one embodiment, from 5:1 to 20:1. In one embodiment, at least 95% of the SAZ-1 zeolite particles are plate-shaped with at least one ratio of at least 3:1, and in one embodiment, at least 5:1. In one embodiment, at least 95% of the SAZ-1 zeolite particles are plate-shaped with at least one ratio in the range from 3:1 to 20:1, and in one embodiment, from 5:1 to 20:1.

Thus, in one embodiment, at least 50% of the SAZ-1 zeolite particles are plate-shaped with at least one ratio of at least 3:1, and in one embodiment, at least 5:1, in combination with a thickness (in the Z direction of FIG. 1) of less than 100 nm, down to about 30 nm. In one embodiment, at least 50% of the SAZ-1 zeolite particles are plate-shaped with at least one ratio in the range from 3:1 to 20:1, and in one embodiment, from 5:1 to 20:1, in combination with a thickness (in the Z direction of FIG. 1) of less than 100 nm, down to about 30 nm. In one embodiment, at least 75% of the SAZ-1 zeolite particles are plate-shaped with at least one ratio of at least 3:1, and in one embodiment, at least 5:1, in combination with a thickness (in the Z direction of FIG. 1) of less than 100 nm, down to about 30 nm. In one embodiment, at least 75% of the SAZ-1 zeolite particles are plate-shaped with at least one ratio in the range from 3:1 to 20:1, and in one embodiment, from 5:1 to 20:1, in combination with a thickness (in the Z direction of FIG. 1) of less than 100 nm, down to about 30 nm. In one embodiment, at least 85% of the SAZ-1 zeolite particles are plate-shaped with at least one ratio of at least 3:1, and in one embodiment, at least 5:1, in combination with a thickness (in the Z direction of FIG. 1) of less than 100 nm, down to about 30 nm. In one embodiment, at least 85% of the SAZ-1 zeolite particles are plate-shaped with at least one ratio in the range from 3:1 to 20:1, and in one embodiment, from 5:1 to 20:1, in combination with a thickness (in the Z direction of FIG. 1) of less than 100 nm, down to about 30 nm. In one embodiment, at least 95% of the SAZ-1 zeolite particles are plate-shaped with at least one ratio of at least 3:1, and in one embodiment, at least 5:1, in combination with a thickness (in the Z direction of FIG. 1) of less than 100 nm, down to about 30 nm. In one embodiment, at least 95% of the SAZ-1 zeolite particles are plate-shaped with at least one ratio in the range from 3:1 to 20:1, and in one embodiment, from 5:1 to 20:1, in combination with a thickness (in the Z direction of FIG. 1) of less than 100 nm, down to about 30 nm.

Another possible way to describe the morphology of plate-shaped SAZ-1 crystals obtained in accordance with the present invention is to consider the ratios between the areas of the crystal faces. If X and Y are the two longest dimensions, then the ratios XY/XZ and XY/YZ represent a measure of how oblong the crystals are. For the zeolite to form a superior catalyst, the Z dimension in this disclosure should be less than about 100 nm, whereas at least one of X and Y should be substantially larger than 100 nm, and in one embodiment larger than 500 nm. In one embodiment, both the X and the Y axes have dimensions larger than 500 nm.

In various embodiments, the crystals of the plate-shaped SAZ-1 zeolite can have a ratio of length to height (or thickness) of about 3:1 to about 20:1, about 4:1 to about 20:1, about 5:1 to about 20:1, or about 7.5:1 to about 20:1. In one embodiment, at least 50% of the SAZ-1 crystals have a ratio of length to height of about 3:1 to about 20:1, about 4:1 to about 20:1, about 5:1 to about 20:1, or about 7.5:1 to about 20:1. In one embodiment, at least 60% of the SAZ-1 crystals have a ratio of length to height of about 3:1 to about 20:1, about 4:1 to about 20:1, about 5:1 to about 20:1, or about 7.5:1 to about 20:1. In one embodiment, at least 70% of the SAZ-1 crystals have a ratio of length to height of about 3:1 to about 20:1, about 4:1 to about 20:1, about 5:1 to about 20:1, or about 7.5:1 to about 20:1.

In various embodiments, the crystals of the plate-shaped SAZ-1 zeolite can have a ratio of length to height (or thickness) of about 3:1 to about 20:1, about 4:1 to about 20:1, about 5:1 to about 20:1, or about 7.5:1 to about 20:1, in combination with a thickness (in the Z direction of FIG. 1) of less than 100 nm, down to about 30 nm. In one embodiment, at least 50% of the SAZ-1 crystals have a ratio of length to height of about 3:1 to about 20:1, about 4:1 to about 20:1, about 5:1 to about 20:1, or about 7.5:1 to about 20:1, in combination with a thickness (in the Z direction of FIG. 1) of less than 100 nm, down to about 30 nm. In one embodiment, at least 60% of the SAZ-1 crystals have a ratio of length to height of about 3:1 to about 20:1, about 4:1 to about 20:1, about 5:1 to about 20:1, or about 7.5:1 to about 20:1, in combination with a thickness (in the Z direction of FIG. 1) of less than 100 nm, down to about 30 nm. In one embodiment, at least 70% of the SAZ-1 crystals have a ratio of length to height of about 3:1 to about 20:1, about 4:1 to about 20:1, about 5:1 to about 20:1, or about 7.5:1 to about 20:1, in combination with a thickness (in the Z direction of FIG. 1) of less than 100 nm, down to about 30 nm.

In one embodiment, the crystals of the SAZ-1 zeolite have a ratio of length to width of about 5:1 to about 1:5, about 6:1 to about 1.5:1, or about 10:1 to about 1:1. In one embodiment, the crystals of the SAZ-1 zeolite have a ratio of length to width of about 2:1 to about 1:2, about 2:1 to about 1.5:1, or about 1.5:1 to about 1:1. Each of the foregoing, in various embodiments, is in combination with a thickness of less than 100 nm.

In one embodiment, the crystals of the plate-shaped SAZ-1 zeolite can have a ratio of height:length:width of about 1:3:3 to about 1:20:20. In one embodiment, the crystals of the plate-shaped SAZ-1 zeolite can have a ratio of height:length:width of about 1:5:5 to about 1:20:20. In one embodiment, the crystals of the SAZ-1 zeolite have a ratio of height:length:width of about 1:10:5 to about 1:20:5. In one embodiment, the crystals of the SAZ-1 zeolite have a ratio of height:length:width of about 1:5:1 to about 1:20:1. As noted, all of the intervening ratios are deemed to be included within the scope of the foregoing ratios, with the proviso that at least one ratio is at least about 1:5, thickness to length or width. Each of the foregoing, in various embodiments, is in combination with a thickness of less than 100 nm.

In one embodiment, the SAZ-1 zeolites obtained according to the present invention have a silicon to aluminum ratio ("SAR") in the range from 7 to 12. In one embodiment, the SAZ-1 zeolites obtained according to the present invention have a SAR in the range from 8 to 11. In one embodiment, the SAZ-1 zeolites obtained according to the present invention have a SAR in the range from 9 to 10. While it is readily possible to make zeolites according to the present invention having higher SAR values, for many of the intended uses of these SAZ-1 zeolites, a SAR within these ranges is most desirable (see, e.g., Ransom, R.; Coote, J.; Moulton, R.; Gao, F.; Shantz, D.; Abstracts of Papers, 255th ACS National Meeting & Exposition, New Orleans, La., United States, Mar. 18-22, 2018 (2018)). The SAR of these zeolites may be determined by conventional analysis. This ratio represents the ratio in the rigid atomic framework of the zeolite crystal, and does not include silicon or aluminum in any binder used in catalytic applications or in any other form within the pores of the zeolite.

In one embodiment, the reaction mixture and the resulting zeolites are free or substantially free of fluorine, fluorine-containing compounds, and fluoride ions. It is understood that in this embodiment, such fluorine-containing moieties may be present as impurities. Thus, in one embodiment, the reaction mixture and the resulting zeolites are free or substantially free of purposely added fluorine, fluorine-containing compounds, and fluoride ions.

The typical source of aluminum oxide for the reaction mixture is faujasite. When faujasite is used, it is also the source of some of the silicon in the SAZ-1 product. Faujasite is widely available commercially, for example, as Zeolite X or Zeolite Y or Zeolite USY, from Zeolyst International. In one embodiment, the faujasite is not dealuminated.

The following example of a process for forming SSZ-39 is taken from U.S. Pat. No. 5,958,370, which may be consulted for additional information on the formation of zeolites and SSZ-39 in particular. The entire disclosure of U.S. Pat. No. 5,958,370 is incorporated herein by reference. The process described in U.S. Pat. No. 5,958,370 may be modified as needed by the skilled person. In the Examples below, similar but somewhat different processes are described for making SAZ-1, but the basic process is much the same. This process, including variations thereof described herein, may be generally referred to as "crystallization conditions". A description of a similar process, using similar "crystallization conditions" may be found in U.S. Pat. No. 9,296,620.

The reaction mixture, which is usually prepared at room temperature, is introduced into a closed container and is maintained at an elevated temperature until the crystals of the zeolite are formed, using mild stirring or static conditions. This hydrothermal treatment is usually conducted in a closed, heated container under autogenous pressure, at a temperature between 100° C. and 200° C., preferably between 135° C. and 170° C., and typically at about 140° C. or about 160° C. The crystallization period is typically from 1 to about 3 days, usually about 24-30 hours.

During the hydrothermal treatment step, the zeolite crystals can be allowed to nucleate spontaneously from the reaction mixture. Alternatively, some seed crystals may be added to the reaction mixture as seeds for crystallization of more of the zeolite. The use of such seed crystals can be advantageous in decreasing the time necessary for complete crystallization to occur. In addition, seeding can lead to an increased purity of the product obtained by promoting the nucleation and/or formation of the desired zeolite crystals over any undesired phases, and may be particularly helpful to obtain crystals having the plate-shaped morphology of the SAZ-1 of the present invention. When used in the present invention, the plate-shaped SAZ-1 seed crystals are added in an amount between 0.1 and 10% of the weight of silica and faujasite used in the reaction mixture.

Once the zeolite crystals have formed, the solid product is separated from the reaction mixture by standard mechanical separation techniques such as filtration. The crystals are water-washed and then dried, e.g., at 90° C. to 150° C. for from 8 to 24 hours, to obtain the as-synthesized zeolite crystals. The drying step can be performed at atmospheric pressure or under vacuum. The thus-formed zeolite may be calcined thereafter to remove the organic base(s), i.e., the OSDA(s), such as MOPEY and PIPPY.

In addition to the process described in the above referenced patents, two additional processes illustrate the broad range of conditions suitable for synthesis of SSZ-39 have been reported. One is by Kubota's group (see, Nakazawa, et. al., Chem. Let., v45, issue 8, pp. 919-921, 2016). One is by Davis's group (see, Dusselier, et. al., Chem. Mater., v. 27, issue 7, pp. 2695-2702, 2015). In both of these processes, a silicon source such as fumed silica (or a colloidal suspension of it, such as Ludox®) is dissolved in a mixture of OSDA and alkali hydroxide (e.g., NaOH). Optionally sodium silicate or other known silica source may be used. Once the silicon source has dissolved completely, water may be removed to concentrate the solution and then faujasite is added as the Al source. The mixture is heated in an autoclave at 140° C.-160° C. (with stirring or under static conditions) until the faujasite has completely converted to SSZ-39. These recipes work well for both piperidinium and phosphonium based OSDAs and are the basis for the following Invention Examples, in which MOPEY is used as described herein.

Unless otherwise specified, all compositional percentages used herein are based on weight. Unless otherwise specified, all temperatures are room temperature, all pressures are atmospheric. The limits of all ranges and ratios may be combined with one another, and all intervening values are deemed to be disclosed. Furthermore, all numerical values are deemed to be preceded by the modifier "about", whether or not this term is specifically stated.

In accordance with the present invention, the reaction mixture or composition initially combined and then reacted to form SAZ-1 as described herein, includes the specified ingredients at the following broad and preferred ranges of the ratios of ingredients:

| Ingredient Ratio | Broad Range | Preferred Range |
|---|---|---|
| Si/Al | 15-90 | 25-45 |
| $H_2O$/Si | 3-40 | 7-28 |
| $OH^-$/Si | 0.4-0.8 | 0.5-0.7 |
| $Q^+$/Si ($Q^+$ = MOPEY + any OSDA in the recipe) | 0.03-0.8 | 0.1-0.2 |

It is noted that in the above table, $OH^-$/Si includes hydroxide from all sources, including the OSDA, the PFA, and the alkali metal hydroxide.
Mole ratios alternatively may be exemplified by the following:
1.0 $SiO_2$/0.02-0.05 $Al_2O_3$/3-40 $H_2O$/0.03-0.8 MOPEY + $Q^+$QH+/0.4-0.8 $OH^-$ General Procedure for SAZ-1 Synthesis Using MOPEY A silicon oxide, e.g., Ludox® AS-40 or PQ Brand N Sodium Silicate or some combination of the two, is added to a PTFE cup. Then enough MOPEY, other quaternary ammonium hydroxide or salt as an OSDA, and optionally, additional amine, is added to achieve a desired ratio of quatemary compounds ($Q^+$) to Si. If additional alkalinity is required, an alkali metal hydroxide may be added at this time. The water content is adjusted as needed to achieve the desired $H_2O$/Si ratio in the reaction mixture. After a few minutes of stirring, when the silicon oxide has dissolved, enough faujasite is added to achieve the desired Si/Al ratio. The stir bar is removed, and the mixture is stirred by hand until it is homogenous. The cup is then placed in an autoclave for 24-48 hours in a 140° C. oven with or without rotation. The autoclave is cooled and the contents removed and isolated by centrifugation or decantation. The solids are washed with water twice and dried at 125° C. overnight in air. Typical yield is 0.2-0.7 grams, depending on the Si/Al ratio of the gel. XRD analysis of the powder shows that SAZ-1 (AEI framework) is the only product formed in the Invention Examples, while other phases are formed in the Comparative Examples. Si/Al composition of the products is measured using X-Ray Fluorescence (XRF). The results for both the Invention Examples and the Comparative Examples are shown in the tables below.

EXAMPLES

Invention Example 1

In a Teflon cup are mixed 4.8 grams AS-40 Ludox® (an ammonia stabilized 40% w/w colloidal silica dispersion from W. R. Grace), 1.2 grams of 50 wt. % NaOH and 2.8 grams of 2,4,4,6-tetramethylmorpholinium (MOPEY) hydroxide (34.26 wt. % aqueous). This mixture is then heated until 0.48 grams water has been evaporated. Then 0.27 grams Zeolite Y (Zeolyst, CBV-500 $SiO_2$/$Al_2O_3$=5.5) is added to the mixture. The cup is placed in a 23 ml autoclave and heated at 160° C. under static conditions for 48 hours. The solid is isolated by decanting the mother liquors, then washing the solids three times and then drying them in air at 120° C. In this manner 0.41 grams of product is obtained which is found to be AEI by XRD without any other phase present. The Si/Al ratio is estimated to be 7.27 by XRF. By SEM, the plate-shaped crystals have typically dimensions of 1.0 μm square and about 50 nm thick.

Invention Example 2

In a 23 mL Teflon cup are mixed 1.127 grams MOPEY hydroxide (34.26 wt. % aqueous), 0.63 grams 20 wt. % PIPPY hydroxide (18% trans) and 7.423 grams $H_2O$. To this mixture was added 4.33 grams sodium silicate solution (28.9 wt. % $SiO_2$+7.8 wt. % $Na_2O$, PQ Corporation) with stirring. Then 0.168 grams Zeolite Y (Zeolyst, CBV-500 $SiO_2$/$Al_2O_3$=5.5) was added. The cup is placed in a 23 mL autoclave and heated at 140° C. while rolled at 40 rpm for 46 hours. The solid product is isolated by decanting the mother liquors, then washing the solids three times and then drying them in air at 120° C. In this manner 0.303 grams of product is obtained which is found to be AEI by XRD without any other phase present. The Si/Al ratio is estimated to be 7.23 by XRF. By SEM, the plate-shaped crystals have typically dimensions of 0.7 um square and about 50 nm thick.

Invention Example 3

The same recipe as Example 2, but the amount of MOPEY hydroxide used is reduced to 0.387 grams and is mixed with 1.889 grams 20 wt. % PIPPY hydroxide (18% trans). The gel is heated at 140° C. while rolled at 40 rpm for 26 hours. The solid is isolated by decanting the mother liquors, then washing the solids three times and then drying them in air at 120° C. In this manner 0.392 grams of product is obtained which is found to be AEI by XRD without any other phase present. The Si/Al ratio is estimated to be 7.92 by XRF. By SEM, the plate-shaped crystals have typically dimensions of 0.5 μm square and about 100 nm thick.

Comparative Example 1

The same recipe is used as Example 1, except that cis-6,10-Dimethyl-5-azoniaspiro[4.5]decane hydroxide was used instead of the morpholinium hydroxide. The other ingredients are unchanged and the sample is heated at 160° C. for 24 hours. Using the same workup procedure, 0.536 grams of SSZ-39 (confirmed by XRD) is isolated with a Si/Al ratio estimated at 11.1 by XRF. The crystals have typical dimensions of 1.0 μm square and 500 nm thick.

Comparative Example 2

The same recipe as Example 2, but no MOPEY hydroxide is used, and the amount of 20 wt. % PIPPY hydroxide (18% trans) is increased to 2.29 grams. The gel is heated at 140° C. while rolled at 40 rpm for 50 hours. The solid is isolated by decanting the mother liquors, then washing the solids three times and then drying them in air at 120° C. In this manner 0.287 grams of product is obtained which is found to be SSZ-39 by XRD without any other phase present. The Si/Al ratio is estimated to be 7.20 by XRF. By SEM, the crystals have typically dimensions of 0.5 μm square and about 200 nm thick.

Invention Examples 4-48 and Comparative Examples C-3-C24

The following gels are prepared and heated at 160° C. for the times specified in the tables. In each case, MOPEY is present (either its cis or trans isomer). In addition, in some cases, another organic compound is added, such as a neutral amine or another OSDA for SSZ-39, e.g., PIPPY or tetraethylphosphonium hydroxide. In each case an AEI framework zeolite is the only product formed, as determined by XRD.

Invention Examples

| Example No. | Additive | Hours @ 160° C. | Si/Al Ratio | $H_2O/SiO_2$ | $OH^-/SiO_2$ | Mopey/ $SiO_2$ | Q/ $SiO_2$ | % trans MOPEY | Product | Product SAR |
|---|---|---|---|---|---|---|---|---|---|---|
| 1 | none | 48 | 31.6 | 7.8 | 0.605 | 0.172 | 0.0 | 1 | ≥99% AEI | 7.26 |
| 2 | 1,1,3,5-Tetramethyl piperidinium (18% trans) | 46 | 32.3 | 28.1 | 0.703 | 0.107 | 0.035 | 1 | ≥99% AEI | 7.23 |
| 3 | 1,1,3,5-Tetramethyl piperidinium (18% trans) | 26 | 31.9 | 27.9 | 0.705 | 0.059 | 0.109 | 1 | ≥99% AEI | 7.59 |
| 4 | none | 64 | 30.7 | 7.8 | 0.569 | 0.169 | 0.0 | 1 | ≥99% AEI | 8.83 |
| 5 | none | 64 | 31.4 | 7.8 | 0.543 | 0.170 | 0.0 | 1 | ≥99% AEI | 9.65 |
| 6 | none | 40 | 30.9 | 7.7 | 0.570 | 0.170 | 0.0 | 1 | ≥99% AEI | 8.62 |
| 7 | 3,5-Dimethylpiperidine | 40 | 30.5 | 7.8 | 0.569 | 0.169 | 0.113 | 1 | ≥99% AEI | 9.24 |
| 8 | 1,3,5-Trimethylpiperidine | 40 | 30.8 | 7.9 | 0.597 | 0.170 | 0.117 | 1 | ≥99% AEI | 8.71 |
| 9 | 2,6-Dimethylmorpholine | 40 | 31.1 | 7.8 | 0.609 | 0.169 | 0.138 | 1 | ≥99% AEI | 8.40 |
| 10 | Triethylamine | 40 | 31.1 | 7.8 | 0.618 | 0.169 | 0.063 | 1 | ≥99% AEI | 8.67 |
| 11 | Tetraethyl phosphonium OH | 41 | 30.8 | 7.8 | 0.540 | 0.153 | 0.017 | 1 | ≥99% AEI | 10.33 |
| 12 | none | 41 | 29.3 | 7.8 | 0.547 | 0.170 | 0.0 | 1 | ≥99% AEI | 9.88 |
| 13 | Tetraethyl phosphonium OH | 41 | 31.1 | 7.8 | 0.541 | 0.152 | 0.017 | 1 | ≥99% AEI | 10.63 |
| 14 | Tetraethyl phosphonium OH | 41 | 31.3 | 7.8 | 0.537 | 0.135 | 0.034 | 1 | ≥99% AEI | 10.62 |
| 15 | Tetraethyl phosphonium OH | 41 | 31.1 | 7.8 | 0.543 | 0.119 | 0.051 | 1 | ≥99% AEI | 10.49 |
| 16 | Tetraethyl phosphonium OH | 41 | 31.1 | 7.8 | 0.542 | 0.102 | 0.068 | 1 | ≥99% AEI | 10.98 |
| 17 | 1,1,3,5-Tetramethyl piperidinium (18% trans) | 136 | 31.3 | 7.8 | 0.608 | 0.072 | 0.102 | 1 | ≥99% AEI | 8.92 |
| 18 | 1,1,3,5-Tetramethyl piperidinium (18% trans) | 136 | 30.5 | 7.7 | 0.613 | 0.097 | 0.082 | 1 | ≥99% AEI | 8.99 |
| 19 | 1,1,3,5-Tetramethyl piperidinium (18% trans) | 136 | 30.2 | 7.9 | 0.608 | 0.108 | 0.056 | 1 | ≥99% AEI | 8.24 |
| 20 | 1,1,3,5-Tetramethyl piperidinium (18% trans) | 136 | 28.3 | 7.7 | 0.610 | 0.020 | 0.079 | 1 | ≥99% AEI | 7.78 |
| 21 | 1,1,3,5-Tetramethyl piperidinium (18% trans) | 136 | 30.9 | 7.7 | 0.612 | 0.040 | 0.059 | 1 | ≥99% AEI | 8.29 |
| 22 | 1,1,3,5-Tetramethyl piperidinium (18% trans) | 136 | 31.0 | 7.8 | 0.618 | 0.060 | 0.040 | 1 | ≥99% AEI | 7.20 |
| 23 | 1,1,3,5-Tetramethyl piperidinium (18% trans) | 93 | 30.5 | 7.8 | 0.619 | 0.081 | 0.020 | 1 | ≥99% AEI | 7.80 |

-continued

| | | | | | | | | | |
|---|---|---|---|---|---|---|---|---|---|
| Invention Examples | | | | | | | | | |
| Example No. | Additive | Hours @ 160° C. | Si/Al Ratio | $H_2O$/ $SiO_2$ | OH—/ $SiO_2$ | Mopey/ $SiO_2$ | Q $SiO_2$ | % trans MOPEY | Product | Product SAR |
| 24 | None | 24 | 30.9 | 7.8 | 0.604 | 0.172 | 0.0 | 1 | ≥98% AEI | 7.10 |
| 25 | None | 48 | 31.2 | 7.8 | 0.719 | 0.173 | 0.0 | 1 | ≥99% AEI | 7.84 |
| 26 | None | 39.25 | 31.2 | 7.8 | 0.606 | 0.172 | 0.0 | 1 | ≥99% AEI | 7.71 |
| 27 | None | 48.25 | 30.3 | 7.7 | 0.607 | 0.172 | 0.0 | 1 | ≥99% AEI | 7.67 |
| 28 | None | 64.25 | 31.3 | 7.8 | 0.609 | 0.172 | 0.0 | 1 | ≥99% AEI | 7.59 |
| 29 | None | 88.5 | 30.3 | 7.7 | 0.606 | 0.171 | 0.0 | 1 | ≥99% AEI | 7.33 |
| 30 | None | 64 | 30.1 | 7.8 | 0.603 | 0.169 | 0.0 | 1 | ≥99% AEI | 7.78 |
| 31 | None | 112 | 30.5 | 7.8 | 0.605 | 0.170 | 0.0 | 1 | ≥99% AEI | 7.65 |
| 32 | 1,1,3,5-Tetramethyl piperidinium (18% trans) | 112 | 30.5 | 7.8 | 0.616 | 0.172 | 0.020 | 1 | ≥99% AEI | NA |
| 33 | None | 112 | 31.4 | 7.8 | 0.602 | 0.170 | 0.0 | 1 | ≥99% AEI | 7.82 |
| 34 | 1,1,3,5-Tetramethyl piperidinium (18% trans) | 112 | 31.3 | 7.8 | 0.602 | 0.031 | 0.039 | 1 | ≥99% AEI | 7.56 |
| 35 | None | 38 | 31.1 | 7.8 | 0.531 | 0.170 | 0.0 | 100 | ≥99% AEI | |
| 36 | None | 38 | 30.9 | 7.8 | 0.539 | 0.171 | 0.0 | 79 | ≥99% AEI | |
| 37 | None | 38 | 30.9 | 7.8 | 0.530 | 0.170 | 0.0 | 60 | ≥99% AEI | |
| 38 | None | 38 | 31.1 | 7.8 | 0.544 | 0.170 | 0.0 | 40 | ≥99% AEI | |
| 39 | None | 38 | 31.3 | 7.9 | 0.529 | 0.172 | 0.0 | 19 | ≥99% AEI | |
| 40 | None | 38 | 31.4 | 7.9 | 0.533 | 0.140 | 0.0 | 58 | ≥99% AEI | |
| 41 | 1,1,3,5-Tetramethyl piperidinium (18% trans) | 26 | 32.0 | 28.1 | 0.703 | 0.074 | 0.068 | 1 | ≥99% AEI | 7.45 |
| 42 | 1,1,3,5-Tetramethyl piperidinium (18% trans) | 46 | 31.6 | 34.1 | 0.700 | 0.106 | 0.034 | 1 | ≥99% AEI | 7.20 |
| 43 | 1,1,3,5-Tetramethyl piperidinium (18% trans) | 26 | 45.6 | 28.0 | 0.717 | 0.109 | 0.035 | 1 | ≥98% AEI | 6.99 |
| 44 | 1,1,3,5-Tetramethyl piperidinium (18% trans) | 46 | 28.9 | 30.2 | 0.709 | 0.115 | 0.038 | 1 | ≥99% AEI | 6.83 |
| 45 | 1,1,3,5-Tetramethyl piperidinium (18% trans) | 46 | 30.9 | 27.4 | 0.695 | 0.103 | 0.034 | 1 | ≥99% AEI | 7.03 |
| 46 | 1,1,3,5-Tetramethyl piperidinium (18% trans) | 26 | 32.2 | 29.8 | 0.700 | 0.104 | 0.036 | 1 | ≥90% AEI | NA |
| 47 | 1,1,3,5-Tetramethyl piperidinium (18% trans) | 72 | 25.9 | 27.5 | 0.688 | 0.117 | 0.021 | 1 | ≥98% AEI | 6.73 |
| 48 | 1,1,3,5-Tetramethyl piperidinium (18% trans) | 72 | 32.4 | 28.1 | 0.702 | 0.126 | 0.015 | 1 | ≥98% AEI | 6.52 |

Comparative examples

| Comp. Example No. | Additive | Hrs at 160 C. | Si/Al Ratio | $H_2O/SiO_2$ | OH—/$SiO_2$ | Mopey/$SiO_2$ | Q/$SiO_2$ | % Trans MOPEY | Product | |
|---|---|---|---|---|---|---|---|---|---|---|
| C-1 | 6,10-Dimethyl-5-azoniaspiro[4.5]decane hydroxide | 24 | 31.2 | 7.8 | 0.617 | NA | 0.172 | NA | ≥99% AEI | |
| C-2 | 1,1,3,5-Tetramethyl piperidinium (18% trans) | 50 (140 C.) | 31.8 | 27.8 | 0.724 | ~0 | 0.139 | — | ≥99% AEI | |
| C-3 | Hunig's base | 40 | 30.2 | 7.9 | 0.570 | 0.170 | 0.099 | 1 | MIXTURE | |
| C-4 | None | 72.25 | 31.5 | 7.8 | 0.606 | 0.172 | 0.0 | 1 | MIXTURE | |
| C-5 | None | 160 | 31.5 | 7.8 | 0.614 | 0.172 | 0.0 | 1 | MIXTURE | |
| C-6 | None | 64 | 31.2 | 7.9 | 0.642 | 0.169 | 0.0 | 1 | OTHER | |
| C-7 | None | 64 | 31.2 | 7.8 | 0.512 | 0.170 | 0.0 | 1 | MIXTURE | |
| C-8 | None | 88 | 31.3 | 7.8 | 0.605 | 0.214 | 0.0 | 1 | MIXTURE | |
| C-9 | None | 88 | 30.9 | 7.7 | 0.602 | 0.246 | 0.0 | 1 | MIXTURE | |
| C-10 | 1,1,3,5-Tetramethyl piperidinium (18% trans) | 112 | 31.2 | 7.8 | 0.611 | 0.051 | 0.019 | 1 | MIXTURE | |
| C-11 | None | 112 | 30.4 | 7.9 | 0.608 | 0.070 | 0.0 | 1 | MIXTURE | |
| C-12 | 1,1,3,5-Tetramethyl piperidinium (20% trans) | 46 | 31.6 | 7.8 | 0.532 | 0.0 | 0.170 | NA | ≥99% AEI | 11.38 |
| C-13 | 1,1,3,5-Tetramethyl piperidinium (20% trans) | 46 | 30.8 | 7.8 | 0.581 | 0.0 | 0.170 | — | ≥99% AEI | 10.53 |
| C-14 | 1,1,3,5-Tetramethyl piperidinium (20% trans) | 40 | 31.3 | 7.8 | 0.605 | 0.0 | 0.171 | — | ≥99% AEI | 9.74 |
| C-15 | 1,1,3,5-Tetramethyl piperidinium (20% trans) | 46 | 30.0 | 7.8 | 0.550 | 0.0 | 0.169 | — | ≥99% AEI | 10.99 |
| C-16 | 1,1,3,5-Tetramethyl piperidinium (20% trans) | 54 | 31.2 | 7.8 | 0.609 | 0.0 | 0.091 | — | ≥99% AEI | |

NOTE: In the Comparative Examples, the product SAR is only shown for the cases in which AEI was formed from a known OSDA and in the absence of MOPEY.

The examples above demonstrate some useful tools to control the synthesis. For example, by adjusting the OH/Si ratio by adding or removing NaOH from the recipe, the Si/Al ratio (and yield) of product can be controlled. So, in Invention Examples 4, 5, and 30, the OH/Si ratio is reduced from 0.603 to 0.543 (all other conditions remaining constant) and the Si/Al ratio of the product rises from 7.78 to 9.6. However, too much or too little alkalinity tends to produce impure product (see Comparative Examples C-6 and C-7). These values are significantly lower than what the traditional OSDA 1,1,3,5-tetramethyl piperidinium (20% trans) produces under similar conditions (see Comparative Examples C-12, C-13, C-14, and C-15). The Si/Al ratio drops if the amount of organic present is reduced and competing phases are more likely to form (see Invention Examples 31, 32, 33, and 34, and Comparative Examples C-10 and C-11) unless enough of a stronger OSDA is added to compensate for the reduced amount of morpholinium compound.

Another means of doing this is to add certain amines. For example adding 3,5-dimethylpiperidine to the recipe in Comparative Example C-7 raised the Si/Al ratio to 9.24 (see Invention Example 7), whereas the other amines tested (1,3,5-trimethyl piperidine, 2,6-dimethyl morpholine and triethyl amine) had no effect and Hunig's base (see Comparative Example C-3) interfered with crystallization and initiated formation of a competing (gmellinite or GME) phase.

The number of hours spent at the crystallization temperature has no effect on either the purity of the phase or its composition (compare Invention Examples 26, 27, to Comparative Examples C-5, C-8, C-9) except after a prolonged time, a small amount of zeolite Beta is sometimes observed. This may be due to the effect of some decomposition of the morpholinium OSDA, so a shorter crystallization time is clearly preferred to make pure product.

Finally, MOPEY is compatible with other OSDAs for AEI (e.g. tetraethyl phosphonium and tetramethyl piperidinium hydroxides) and blending them together in the recipe shows some cooperative effects that increase the Si/Al ratio (e.g., Invention Examples 13, 14, 15, and 16).

Morphology:

Invention Example 12 is examined using a scanning electron microscope to determine the size and shape of the individual crystals. In contrast to crystals of AEI made using a piperidinium or phosphonium based OSDA, the SAZ-1 crystals made using the morpholinium compound are thin sheets or plates with length and width about 0.5 microns and 100 nm or less thickness, down to about 30 nm. The aspect ratio is therefore 5 to 1 or higher.

In one embodiment, one can select the one or more of the aspect ratios or the thickness of the crystals towards the conventional cuboid morphology by blending the MOPEY OSDA with a piperidinium OSDA, e.g., PIPPY, or phosphonium based OSDA. In one embodiment, the aspect ratios increase with increased content of the MOPEY relative to the "standard" OSDA, e.g., PIPPY, when the synthesis is conducted with the MOPEY. The ability to control the shape of the crystals allows one to improve the activity of the material (which is useful when it is used as a catalyst in a continuous flow process) by exposing a higher percentage of the unit cells to the feedstock without increasing the pressure drop across (or impeding the flow through) the fixed catalyst bed. When used as SCR catalyst for diesel and other engines, this new morphology can enable lower NOx emissions to meet a more stringent emission standard, without affecting the engine compression and reducing its fuel economy.

FIG. 1 is a schematic depiction of a representative plate-shaped crystal made in accordance with the present invention defining the X, Y, and Z axes, as described herein.

Figure 2:
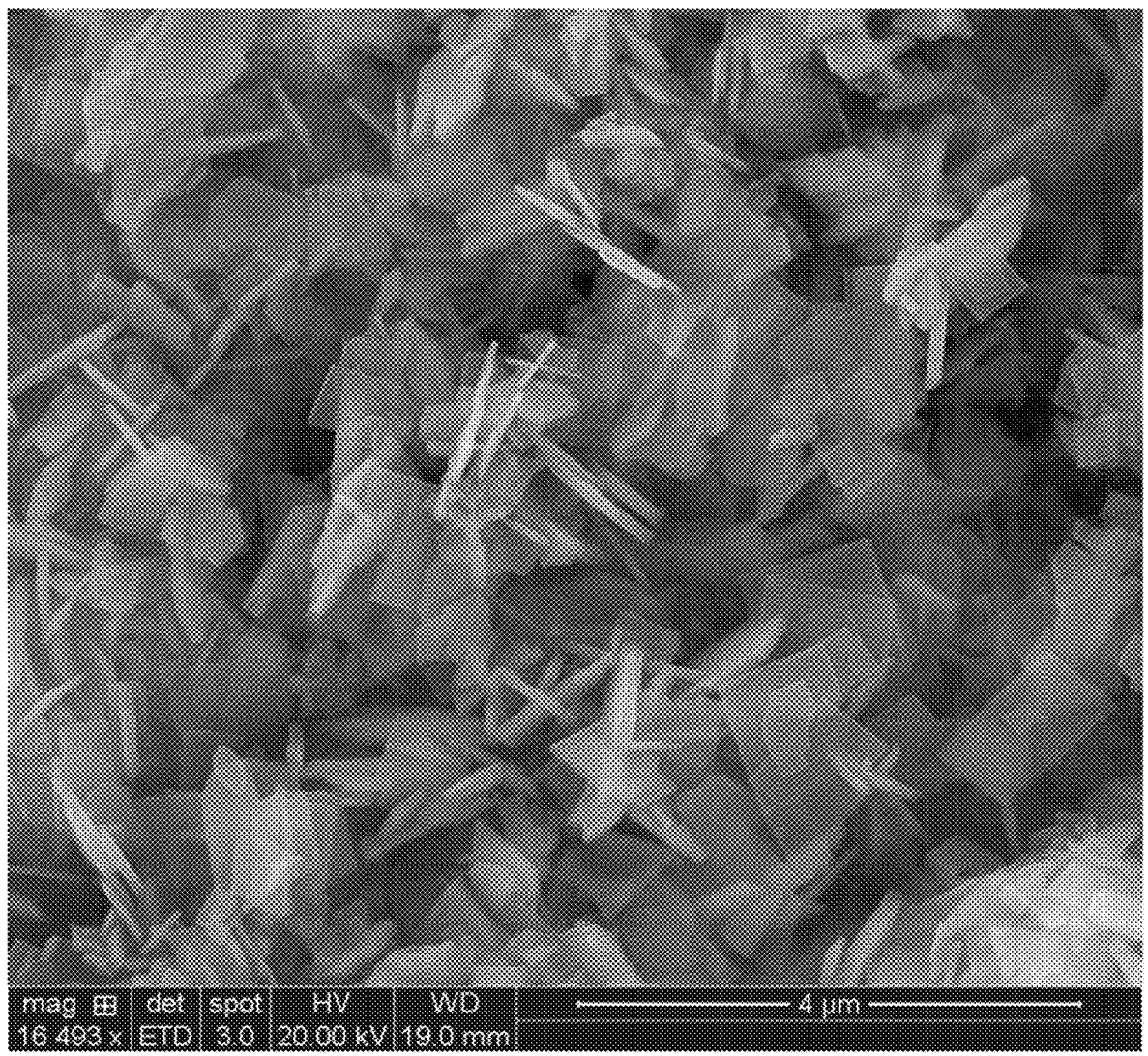
FIG. 2 is a photomicrograph of plate-shaped, planar crystals of SAZ-1 made in accordance with an embodiment of the present invention.

FIG. 2 is a photomicrograph of crystals of SAZ-1 made in accordance with an embodiment of the present invention. The photomicrograph in FIG. 2 shows crystals produced according to Example 25 in Table 1. The Mopey (1% trans) was used as the sole organic at a ratio of 0.173 to Si in a gel with Si/Al ratio of 31.2, a H$_2$O/Si ratio of 7.8 and a OH/Si ratio of 0.719. The solution was heated with stirring for 48 hours at 160° C. According to the FIG. 2 photomicrograph, the as-made crystals have length and width of about 700 nm on average and the thickness is about 75 nm.

Figure 3:
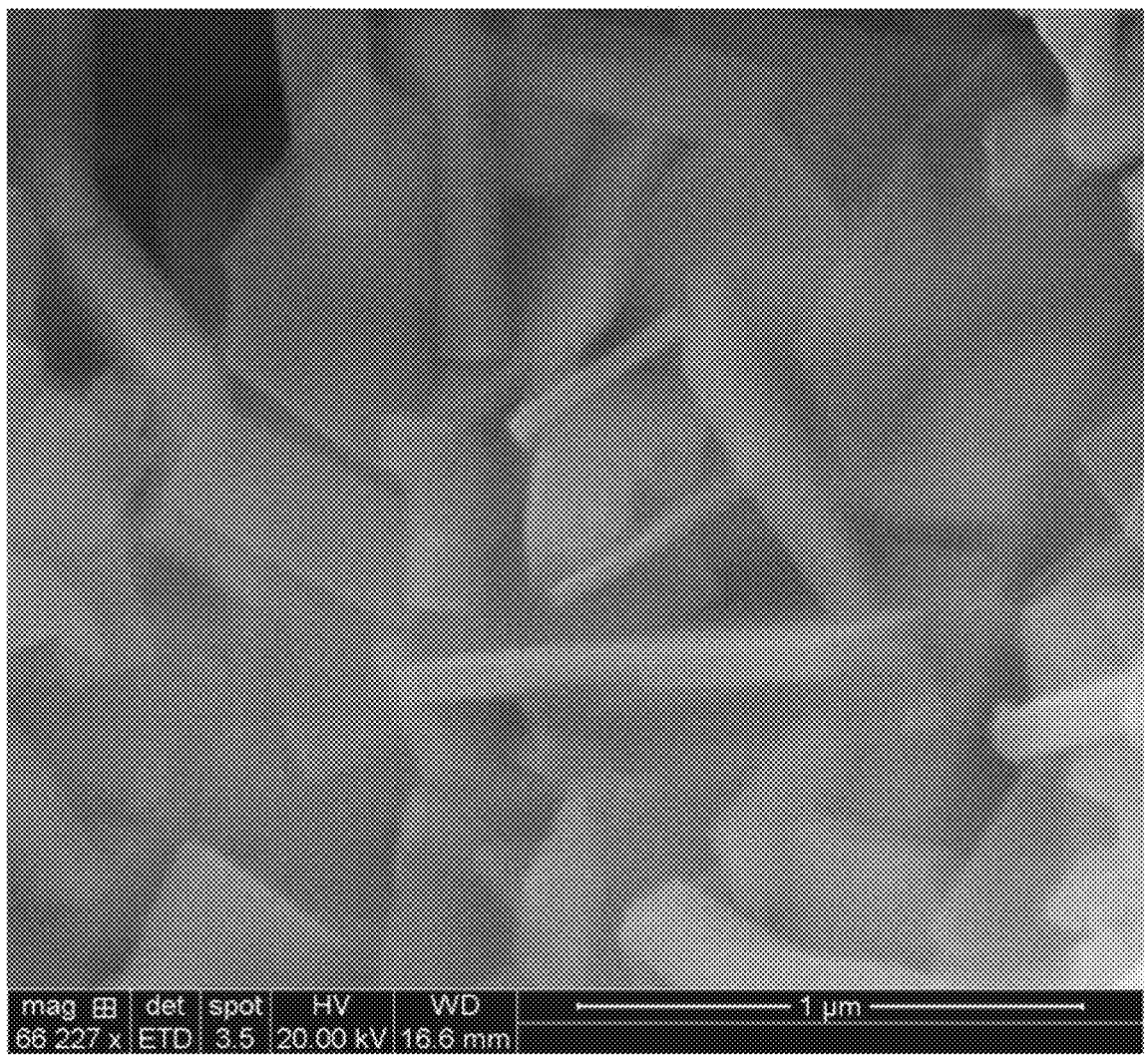
FIG. 3 is a photomicrograph of plate-shaped, planar crystals of SAZ-1 made in accordance with another embodiment of the present invention.

FIG. 3 is a photomicrograph of crystals of SAZ-1 made in accordance with another embodiment of the present invention. The plate-shaped crystals shown in FIG. 3 were produced according to Example 47 in Table 1. The Mopey (1% trans) was used at a ratio of 0.117, combined with 18% trans PIPPY at a ratio of 0.021 to Si in a gel with Si/Al ratio of 25.9, a H$_2$O/Si ratio of 27.5, and a OH/Si ratio of 0.688. The solution was heated with stirring for 72 hours at 140° C. According to the FIG. 3 photomicrograph, the as-made crystals have length and width of about 600 nm on average and the thickness is about 65 nm.

Figure 4:
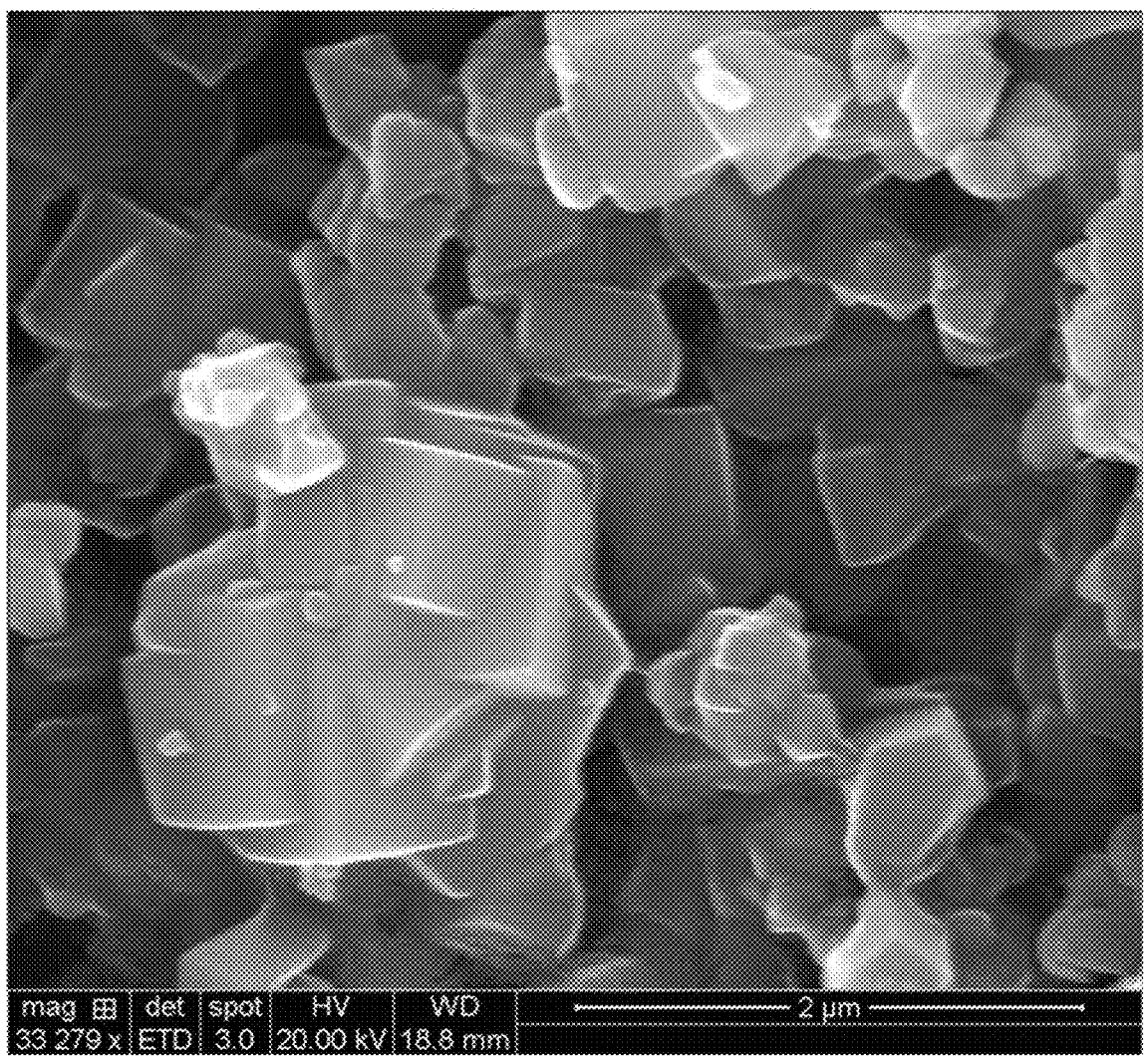
FIG. 4 is a photomicrograph of crystals of a zeolite made in accordance with a comparative example, as in the prior art.

FIG. 4 is a photomicrograph of crystals of a zeolite made in accordance with a comparative example, as in the prior art. The photomicrograph in FIG. 4 shows crystals produced as per Example C-1 in Table 2. The OSDA (cis-6,10-dimethyl-5-azoniaspiro[4.5]decane hydroxide was used at a ratio of 0.172 in a gel with Si/Al ratio of 31.2, a H$_2$O/Si ratio of 7.8, and a OH/Si ratio of 0.617. The solution was heated without stirring for 24 hours at 160° C. According to the FIG. 4 photomicrograph, the as-made crystals have length, width and thickness about 400 nm on average.

Figure 5:
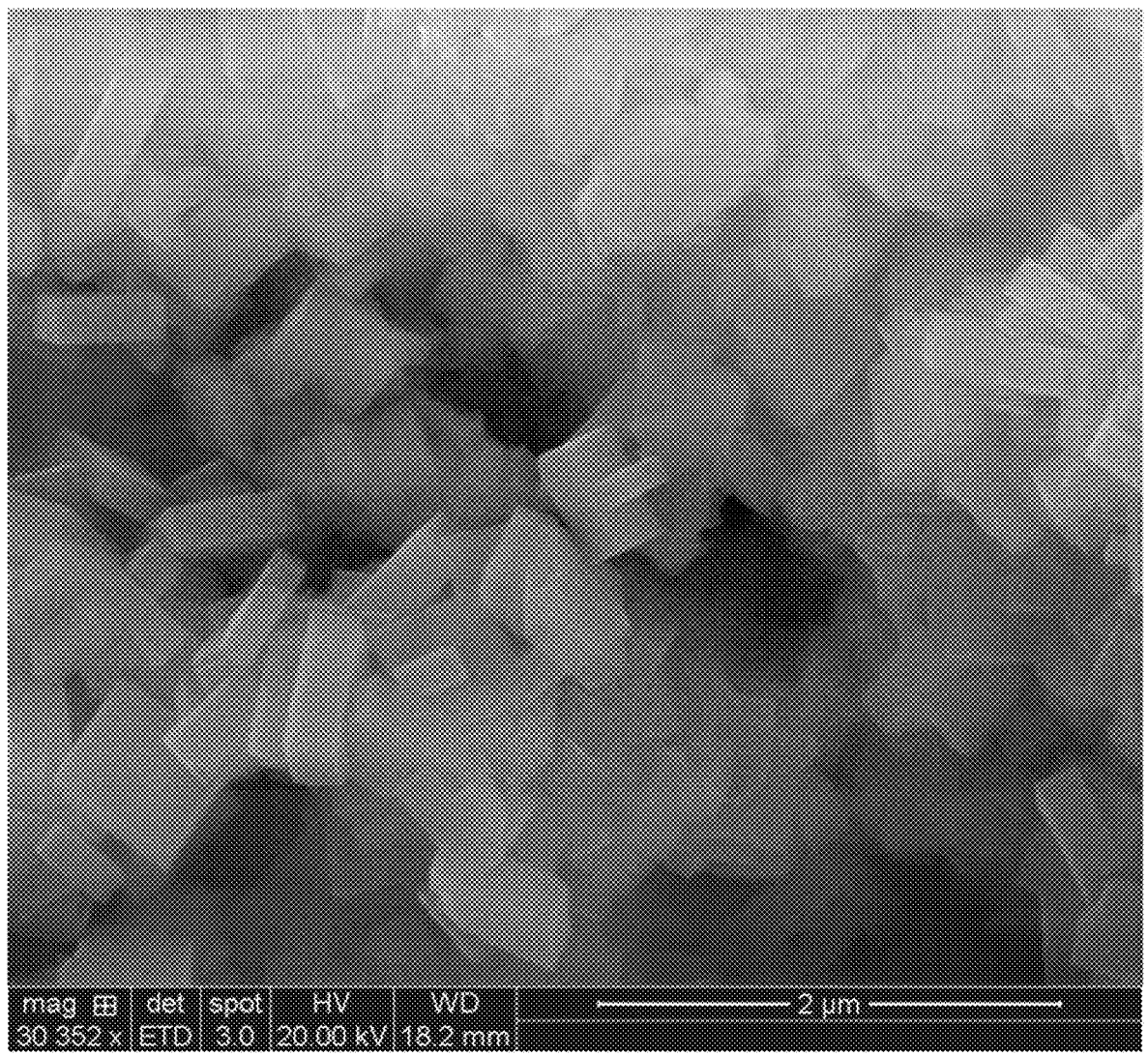
FIG. 5 is a photomicrograph of crystals of a zeolite made in accordance with another comparative example, as in the prior art.

FIG. 5 is a photomicrograph of crystals of a zeolite made in accordance with another comparative example, as in the prior art. The photomicrograph in FIG. 5 shows crystals produced as per Example C-2 in Table 2. The OSDA (18% trans PIPPY) was used at a ratio of 0.139 in a gel with Si/Al ratio of 31.8, a H$_2$O/Si ratio of 27.8, and a OH/Si ratio of 0.724. The solution was heated with stirring for 50 hours at 140° C. According to the FIG. 5 photomicrograph, the as-made crystals have length and width of about 500 nm on average and a thickness of about 200 nm.

Figure 6:
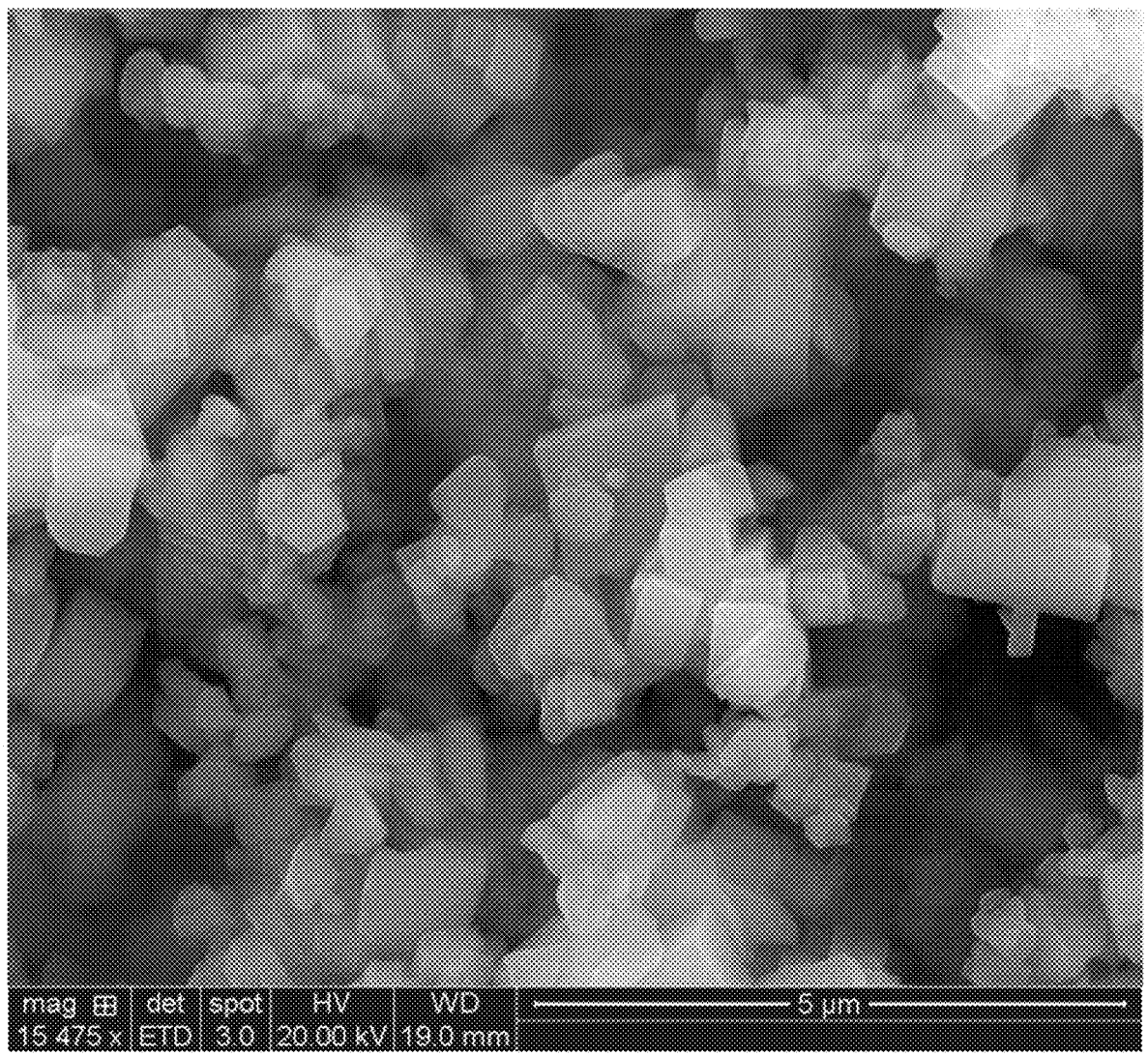
FIG. 6 is a photomicrograph of crystals of a zeolite made in accordance with another comparative example, as in the prior art.

FIG. 6 is a photomicrograph of crystals of a zeolite made in accordance with another comparative example, as in the prior art. The photomicrograph in FIG. 6 shows crystals produced as per Example C-16 in Table 2. The OSDA (75% trans PIPPY) was used at a ratio of 0.091 in a gel with Si/Al ratio of 31.2, a H$_2$O/Si ratio of 7.8, and a OH/Si ratio of 0.609. The solution was heated with stirring for 54 hours at 160° C. According to the FIG. 6 photomicrograph, the as-made crystals are cubic with each edge about 500 nm in length.

Figure 7:
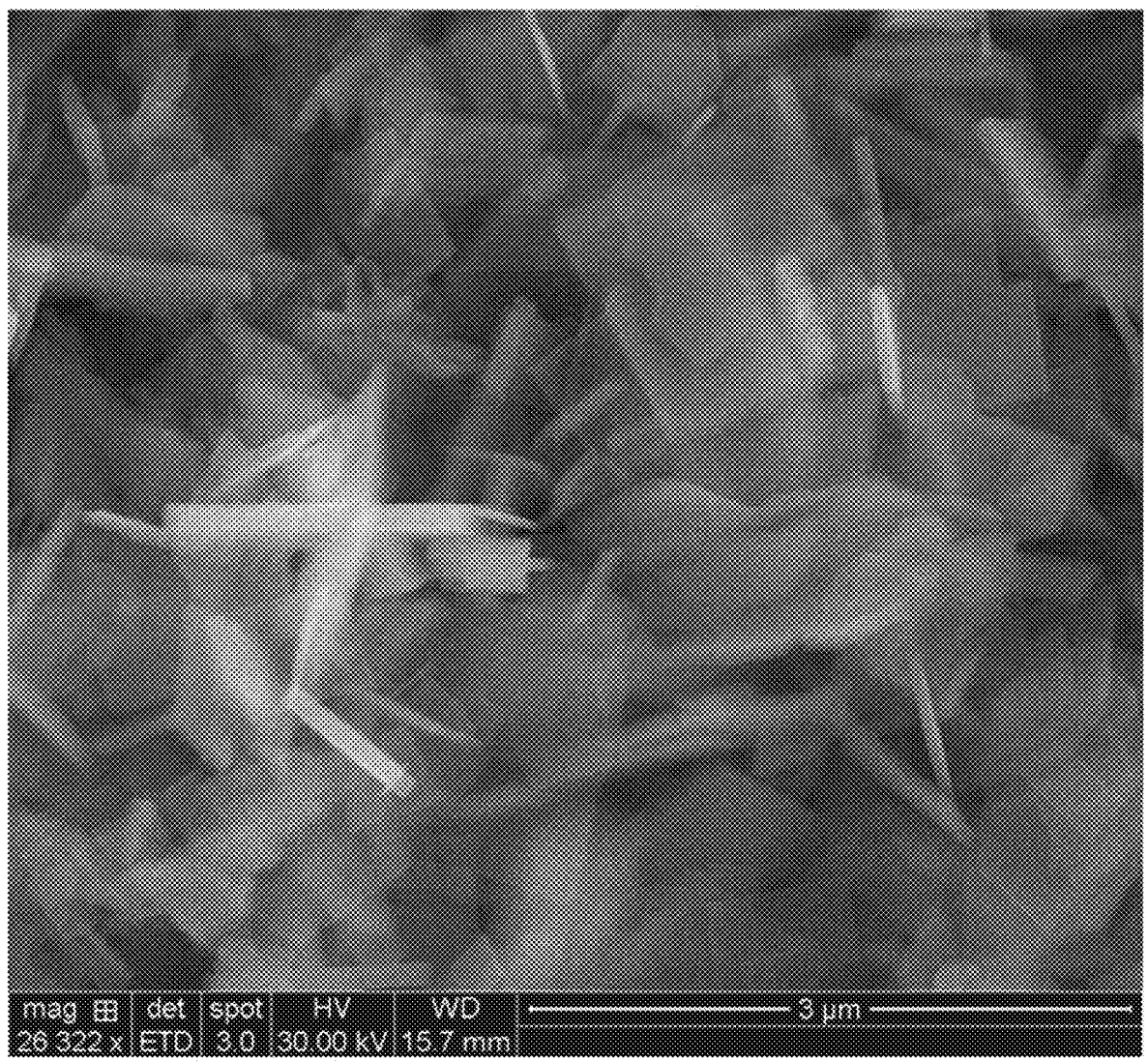
FIG. 7 is a photomicrograph of plate-shaped, planar crystals of SAZ-1 made in accordance with an embodiment of the present invention.

FIG. 7 is a photomicrograph of crystals of SAZ-1 produced as per Example 28 in Table 1. The MOPEY (1% trans) was used as the sole organic at a ratio of 0.172 to Si in a gel with Si/Al ratio of 31.3, a H$_2$O/Si ratio of 7.8 and a OH/Si ratio of 0.609. The solution was heated without stirring for 64 hours at 160 C. According to the FIG. 7 photograph, the as-made crystals have length and width of about 900 nm on average and the thickness is about 90 nm.

Figure 8:
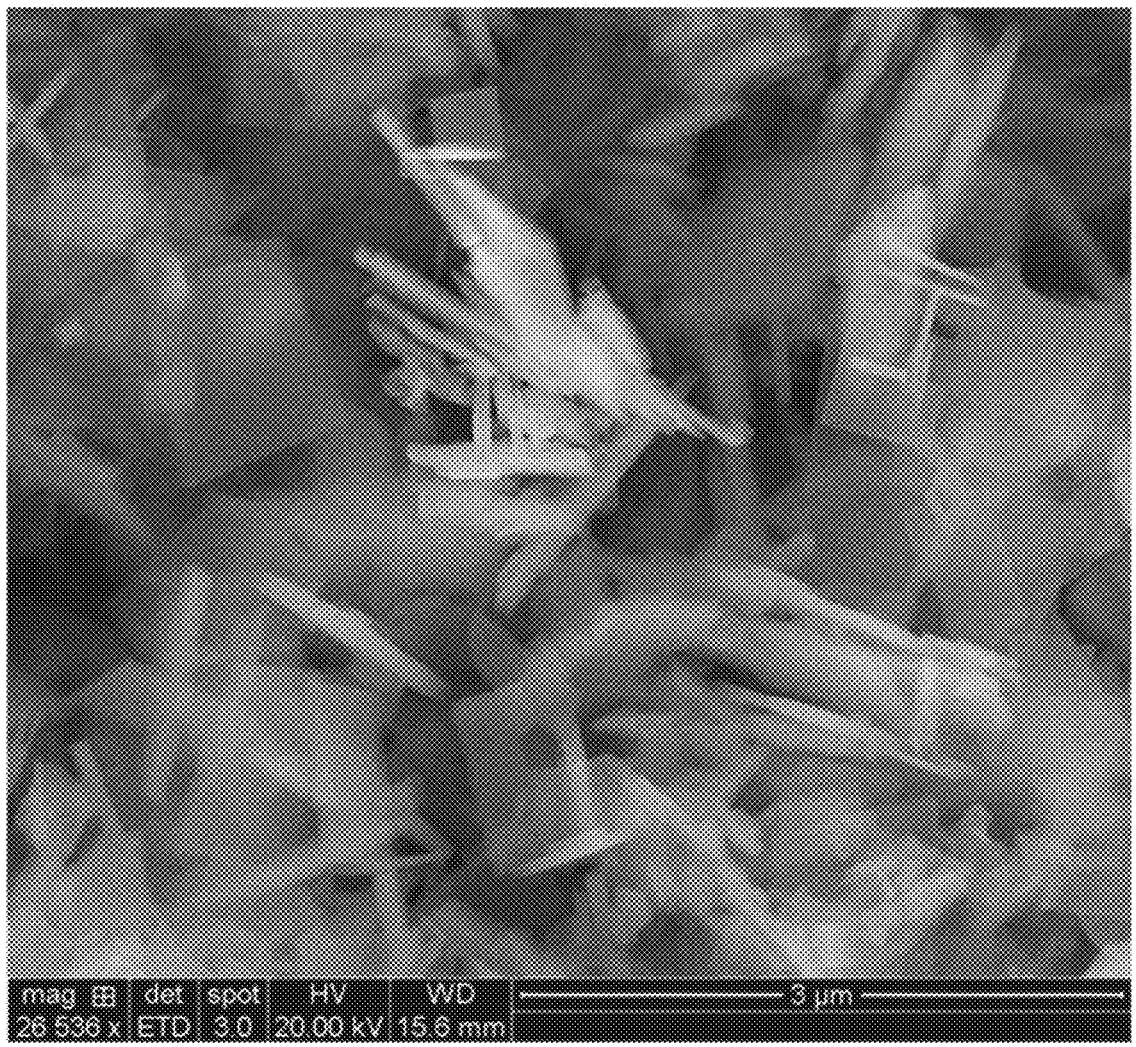
FIG. 8 is a photomicrograph of plate-shaped, planar crystals of SAZ-1 made in accordance with another embodiment of the present invention.

FIG. 8 is a photomicrograph of crystals of SAZ-1 produced as per Example 26 in Table 1, The MOPEY (1% trans) was used as the sole organic at a ratio of 0.172 to Si in a gel with Si/Al ratio of 31.2, a H$_2$O/Si ratio of 7.8 and a OH/Si ratio of 0.606. The solution was heated without stirring for 39 hours at 160 C. According to the FIG. 8 photograph, the as-made crystals have length and width of about 800 nm on average and the thickness is about 75 nm.

Figure 9:
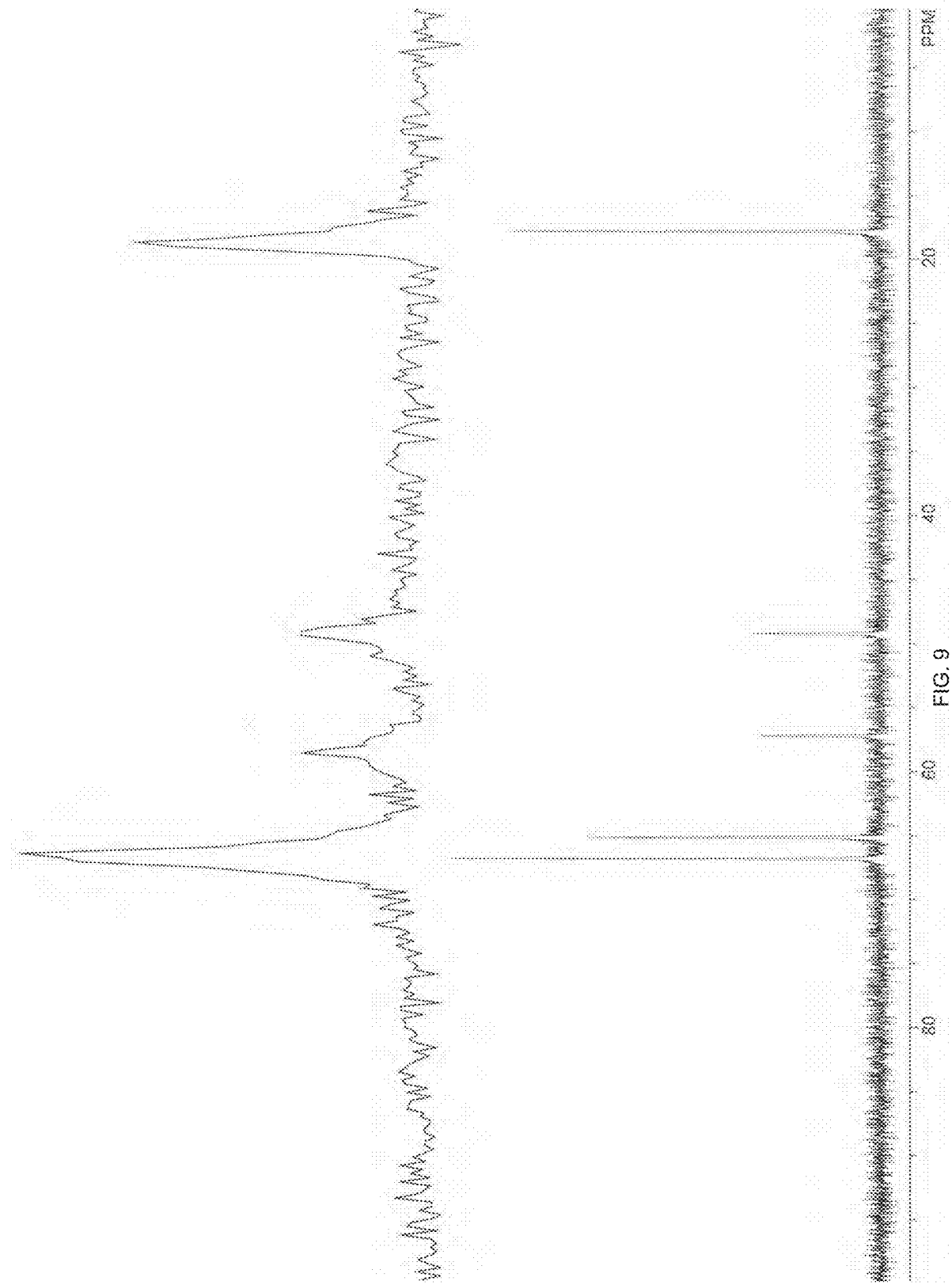
FIG. 9 shows two NMR spectra superposed to illustrate the correspondence between peaks of MOPEY and peaks of a crystalline product obtained in accordance with an embodiment of the invention.

FIG. 9 shows two NMR spectra superposed to illustrate the correspondence between peaks of MOPEY and peaks of a crystalline product obtained in accordance with an embodiment of the invention. As disclosed herein, the present invention provides a crystalline AEI zeolite having pores comprising a 2,4,4,6-tetramethylmorpholinium cation, i.e., MOPEY. In this embodiment, the initially formed and isolated crystals of SAZ-1 include MOPEY, and this is a new composition of matter.

To demonstrate that cis-MOPEY was contained in the pores of the new zeolite SAZ-1, the material obtained in Example 25 in the table of Inventive Examples was rinsed thoroughly three times with deionized water, then dried at 125° C. in air. It was then subjected to examination by solid state CP/MAS 13C-NMR. This examination showed 13 C resonances belonging to an organic species at approximately 19, 49, 59 and 68 ppm. To confirm the identity of this organic species as unchanged cis-MOPEY, a 13C-NMR spectrum of the cis-MOPEY used in that zeolite synthesis (in the iodide form) was then obtained in deuterium oxide.

FIG. 9 shows the two 13C-NMR spectra stacked on the same horizontal scale (in ppm), with the solid state spectrum above the solution phase spectrum. The three upfield peaks at 19, 49 and 59 ppm in each spectrum match up perfectly. As is to be expected, these peaks are very broad in the solid state spectrum as compared to the matching peaks in the solution phase spectrum, but they are still centered at the same chemical shift. It is the nature of a solid state NMR experiment to produce very broad peaks compared to a solution phase experiment on the same organic substance. As a consequence, peaks that are close together in chemical shift but still resolvable in the solution phase experiment are rarely resolvable in the solid state experiment. That is the case for the two farthest downfield peaks in the solution spectrum, which are too close together to be resolved in the solid state spectrum and instead show up as a single broad peak—but still centered at approximately the same chemical shift."

Based on the foregoing, it will be understood by the skilled person that the initially isolated crystals of the AEI zeolite herein designated SAZ-1 contain both the AEI zeolite structure and the MOPEY used to make this new zeolite.

While the principles of the invention have been explained in relation to certain particular embodiments, and are provided for purposes of illustration, it is to be understood that various modifications thereof will become apparent to those skilled in the art upon reading the specification. Therefore, it is to be understood that the invention disclosed herein is intended to cover such modifications as fall within the scope of the appended claims. The scope of the invention is limited only by the scope of the appended claims.

The invention claimed is:

1. An aluminosilicate zeolite comprising at least 90% phase pure AEI zeolite, wherein the AEI zeolite comprises crystals having a plate-shaped morphology, wherein at least 50% of the crystals have at least one ratio in at least one pair of dimensions in the range from 5:1 to 20:1, and wherein at least 50% of the crystals have a thickness in the range from 30 nm to 100 nm.

2. The aluminosilicate zeolite of claim 1 wherein at least 50% of the crystals have a ratio of length to height of 7.5:1 to 20:1.

3. The aluminosilicate zeolite of claim 1 wherein at least 75% of the crystals have a thickness in the range from 30 nm to 100 nm.

4. The aluminosilicate zeolite of claim 1 wherein at least 50% of the crystals range from about 0.3-2.0 micron in length, from about 0.3-2.0 micron in width, and from about 30 nm to about 100 nm in thickness.

5. The aluminosilicate zeolite of claim 2 wherein at least 75% of the crystals have a thickness in the range from 30 nm to 100 nm.

6. The aluminosilicate zeolite of claim 2 wherein at least 50% of the crystals range from about 0.3-2.0 micron in length, from about 0.3-2.0 micron in width, and from about 30 nm to about 100 nm in thickness.

7. A process of making an aluminosilicate zeolite having an AEI framework comprising reacting a mixture comprising an oxide of silicon, faujasite, a quaternary ammonium compound comprising a 2,4,4,6-tetramethylmorpholinium cation, an alkali metal hydroxide and water at a temperature of at least 100° C. for a time sufficient to form crystals of an aluminosilicate zeolite having an AEI framework.

8. The process of claim 7 wherein the quaternary ammonium compound further comprises an organic structure directing agent known for making SSZ-39.

9. The process of claim 7 wherein the quaternary ammonium compound further comprises a N,N-dimethyl-3,5-dimethylpiperidinium cation.

10. A crystalline AEI zeolite having pores comprising a 2,4,4,6-tetramethylmorpholinium cation, wherein the zeolite is an aluminosilicate.

11. The crystalline AEI zeolite of claim 10 wherein the pores further comprise a N, N-dimethyl-3,5-dimethylpiperidinium cation.

12. The crystalline AEI zeolite of claim 11 wherein the zeolite comprises at least 90% phase pure AEI zeolite.

13. The crystalline AEI zeolite of claim 11, wherein the AEI zeolite comprises crystals have a plate-shaped morphology.

14. The crystalline AEI zeolite of-claim 11 wherein at least 50% of the crystals have at least one ratio in at least one pair of dimensions in the range from 3:1 to 20:1.

15. The crystalline AEI zeolite of claim 11 wherein at least 50% of the crystals range from about 30 nm to about 100 nm in thickness.

16. The crystalline AEI zeolite of claim 10 wherein the zeolite comprises at least 90% phase pure AEI zeolite.

17. The crystalline AEI zeolite of claim 10, wherein the AEI zeolite comprises crystals have a plate-shaped morphology.

18. The crystalline AEI zeolite of claim 10 wherein at least 50% of the crystals have at least one ratio in at least one pair of dimensions in the range from 3:1 to 20:1.

19. The crystalline AEI zeolite of claim 10 wherein at least 50% of the crystals range from about 30 nm to about 100 nm in thickness.

\* \* \* \* \*